(12) United States Patent
Chang et al.

(10) Patent No.: US 8,943,519 B2
(45) Date of Patent: Jan. 27, 2015

(54) SMART PROGRESS INDICATOR FOR SCRIPT PROCESSING

(75) Inventors: Belinda Y. Chang, Cary, NC (US); John R. Hind, Raleigh, NC (US); Robert E. Moore, Durham, NC (US); Brad B. Topol, Cary, NC (US); Jie Xing, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1516 days.

(21) Appl. No.: 11/672,560

(22) Filed: Feb. 8, 2007

(65) Prior Publication Data

US 2008/0196045 A1 Aug. 14, 2008

(51) Int. Cl.
| | |
|---|---|
| G06F 3/00 | (2006.01) |
| G06F 9/44 | (2006.01) |
| G06F 9/46 | (2006.01) |
| G06F 13/00 | (2006.01) |
| G06F 9/455 | (2006.01) |

(52) U.S. Cl.
CPC .................... G06F 9/45512 (2013.01)
USPC .............................. 719/320; 703/2

(58) Field of Classification Search
USPC .............. 719/313, 320; 703/14; 717/135
See application file for complete search history.

(56) References Cited

U.S. PATENT DOCUMENTS

| | | | |
|---|---|---|---|
| 6,973,417 B1 * | 12/2005 | Maxwell et al. .................. | 703/2 |
| 2003/0005023 A1 | 1/2003 | Gilbert et al. | |
| 2005/0187750 A1 * | 8/2005 | Satoh et al. ...................... | 703/14 |
| 2006/0195846 A1 * | 8/2006 | Benedetti ....................... | 718/102 |
| 2008/0127147 A1 * | 5/2008 | Bottomley et al. ............ | 717/151 |

OTHER PUBLICATIONS

SweDesignz.com, Script Execution Time, Wed Design, Jun. 23, 2006, 2 pages.*
O'Conner, Scripting for the Java Platform, Sun Microsystems, Inc., Jul. 2006, pp. 1-10.*
Zechner, Klaus, et al; DiaSUMM: Flexible Summarization of Spontaneous Dialogues in Unrestricted Domains; ACM Digital, Library; 2000.
Stolcke, A., et al; Dialogue Act Modeling for Automatic Tagging and Recognition of Conversational Speech; ACM Digital Library; 2000.

* cited by examiner

*Primary Examiner* — Diem Cao
(74) *Attorney, Agent, or Firm* — Steven M. Greenberg, Esq.; CRGO Law

(57) ABSTRACT

Embodiments of the present invention address deficiencies of the art in respect to progress indication and provide a method, system and computer program product for intelligent progress indication for script processing. In one embodiment, a progress indication data processing system can be provided. The system can include a script execution engine such as an ANT configured script execution engine, a history table, and a smart progress indicator coupled to the history table. The indicator can include program code enabled to compute an expected duration of execution of a script such as an ANT script by the script execution engine based upon measured observed durations of execution for annotated portions of the script, for instance, both for the current execution and for previous successful executions.

20 Claims, 2 Drawing Sheets

SMART PROGRESS INDICATOR FOR SCRIPT PROCESSING

BACKGROUND OF THE INVENTION

1. Field of the Invention

The present invention relates to the field of script processing and more particularly to the field of progress indicator management for script processing.

2. Description of the Related Art

Trends in computer science have included a larger emphasis upon program logic which is no longer confined to mere compiled code. Due in part to the explosion of different platform types deployed about the computing world, processor specific compiled logic no longer meets the requirements of every user. To accommodate the new paradigm, script logic has supplanted compiled logic at least in the context of automating computing tasks irrespective of the computing platform.

Generally, script logic involves a platform agnostic set of instructions which, at run-time, can be interpreted by a script engine. The script engine can translate the agnostic set of instructions into platform specific instructions which in turn can be executed in the specific platform. Examples include not only client side, Web browser based and server-side executed scripts such as Javascript and VBScript, but also more directed scripting environments including Perl and ANT. Thus, while script logic generally has existed in one form or another for decades, including rudimentary forms of the BASIC programming language, the diversification of operable computing platforms has breathed new life into this mode of computing.

Tracking the progress of the execution of a computer program can be important for many applications—especially application installation programs, application update programs and the like. In this regard, as the processing for these programs can consume a great deal of time, it can be helpful for an end user not only to know that the application remains operable and has not "hung", but also to know how much time remains before the processing completes. In both the case of compiled logic and script logic, developers customarily hard-coded a progress indicator that indicated how much of the processing has completed, albeit without any great precision.

Scripting languages, in particular, often fail to incorporate progress indication logic. To provide a crude form of progress indication, developers insert static markers within a script to produce milestones of progress. The milestones of progress can be captured by additional logic and utilized to render a progress indicator. Notwithstanding, because embedded markers are static in nature, the value displayed in a progress indicator only is as valid as the developer's a priori guess regarding the relative duration of the various portions of the script demarcated by the static markers.

BRIEF SUMMARY OF THE INVENTION

Embodiments of the present invention address deficiencies of the art in respect to progress indication and provide a novel and non-obvious method, system and computer program product for intelligent progress indication for script processing. In one embodiment, a progress indication data processing system can be provided. The system can include a script execution engine such as an ANT configured script execution engine, a history table, and a smart progress indicator coupled to the history table via the script execution engine. The indicator can include program code enabled to compute an expected duration of execution of a script such as an ANT script by the script execution engine based upon measured observed durations of execution for annotated portions of the script, both for the current execution and for previous successful executions.

In one aspect of the embodiment, the annotated portions of the script can include script logic preceded by a tag specifying a duration of execution for the script logic. In another aspect of the embodiment, the annotated portions of the script can include script logic preceded by a tag specifying a duration of execution for the script logic and conditions precedent for executing the script logic. In yet another aspect of the embodiment, the smart progress indicator further can include program code enabled to establish an expected relative duration for each annotated portion of the script. Finally, in even yet another aspect of the embodiment, the smart progress indicator further can include program code enabled to update the expected relative duration for each annotated portion of the script, based on observed duration of execution values for each annotated portion of the script.

In another embodiment of the invention, a progress indication method for script processing can be provided. The method can include computing an expected duration of execution of a script by a script execution engine based upon measured observed durations of execution for annotated portions of the script each annotation indicating an expected duration of execution for a corresponding portion of the script. The method further can include rendering a progress indication of the execution of the script according to the expected duration of execution of the script and an observed completion of execution of portions of the script.

In one aspect of the embodiment, computing an expected duration of execution of a script by a script execution engine based upon measured observed durations of execution for annotated portions of the script each annotation indicating an expected duration of execution for a corresponding portion of the script can include identifying annotated portions of the script, determining an expected duration of execution for each of the annotated portions, computing an expected duration of execution for the script based upon the expected duration of execution determined for each of the annotated portions, providing an indication of the computed expected duration, executing at least one of the annotated portions, measuring an actual duration of execution for the at least one annotated portion, and modifying the expected duration of execution for the script to account for the actual duration of execution for the at least one annotated portion.

In another aspect of the embodiment, the method further can include storing the expected duration of execution determined for each of the annotated portions in a history table. In yet another aspect of the embodiment, the method further can include factoring observed durations of execution for the annotated portions into stored duration values in the history table for corresponding ones of the annotated portions. In even yet another aspect of the embodiment, the method can include determining conditions precedent to executing the annotated portions of the script, selecting individual ones of the annotated portions unable to be executed based upon the conditions precedent, and modifying the expected duration of execution for the script to account for the selected individual ones of the annotated portions.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for intelligent progress indication for script processing. In accordance with an embodiment of the present invention, a script can be annotated to indicate a duration value for different portions of the script. A history can be established for the different portions, the records of the history corresponding to the different portions and including a historical indication of a duration of execution or interpretation for each of the different portions. At runtime, the expected total duration for the script can be computed from the history and the progress of execution can be tracked during the course of execution of the script.

The progress of execution and the expected total duration can be modified during the course of execution or interpretation as conditional logic within the script can resolve to selected ones of the different portions becoming excluded from execution or interpretation. Likewise, the progress of execution and the expected total duration can be modified during the course of execution or interpretation as conditional logic within the script can resolve to selected ones of the different portions becoming repeatedly executed or interpreted. In either case, at all times the resulting duration of execution for any one of the different portions of the script can be factored into the historical duration in the history to provide a more accurate view of the execution time for the different portions of the script during subsequent execution or interpretation of the script.

Figure 1:
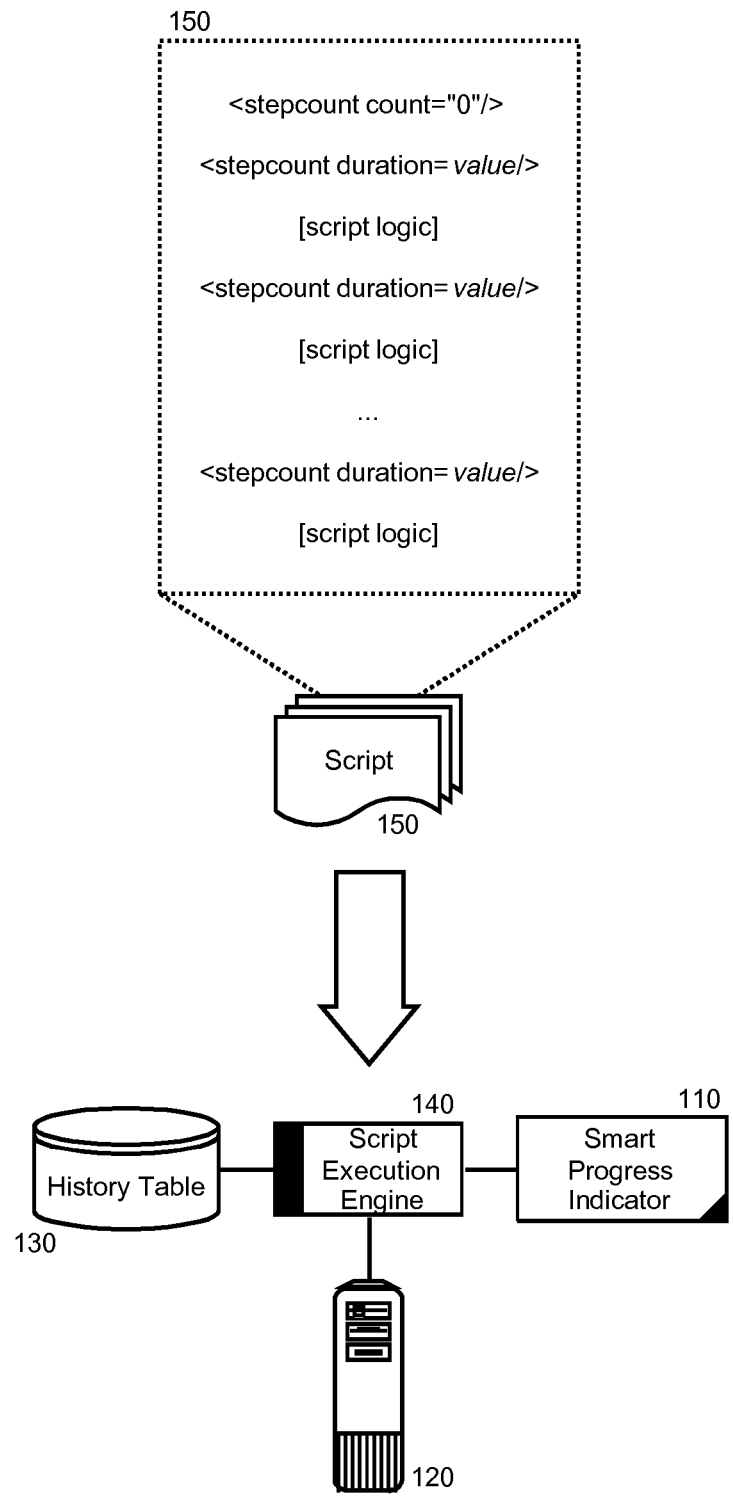
FIG. 1 is a schematic illustration of data processing system configured for intelligent progress indication for script processing; and, FIG. 2 is a flow chart illustrating a process for intelligent progress indication for script processing.

In further illustration, FIG. 1 is a schematic illustration of data processing system configured for intelligent progress indication for script processing. The system can include a host computing platform 120 arranged to support the operation of a script execution engine 140. The script execution engine 140 can include a configuration for executing and/or interpreting scripts 150 conforming to a specified script processing language. Exemplary script execution engines can include Apache ANT™ to name only a single example, and exemplary script processing languages include the PHP Group PHP™ scripting language.

Notably, a smart progress indicator 110 can be coupled to the script execution engine 140. The smart progress indicator 110 can include program code enabled to identify annotations within the script 150 to compute a progress of execution of the script 150 and to report the same to an end user through a suitable user interface. The annotations can specify an anticipated duration of execution for an annotated portion of the script 150, where the anticipated duration is denoted by specific script tags, for example <stepcount duration=value/>. In particular, the anticipated duration can be a relative duration such as an integer value. In the latter circumstance, the integer values can correlate to subjective durations such as short, medium, long and very long, to name only one example.

The program code of the smart progress indicator 110 further can be enabled to tune the duration of execution of particular annotated portions of the script 150 in the history table 130. Specifically, the actual duration of execution for annotated portions of the script 150 can be observed and factored into respective values stored in the history table 130 for corresponding ones of the annotated portions of the script 150. For instance, each observed duration for an annotated portion of the script 150 can be averaged into the existing value reflected in a record in the history table 130 for the annotated portion of the script 150.

Utilizing the expected duration of execution for each annotated portion of the script 150, an expected duration of execution for the entirety of the script 150 can be computed. Additionally, as it becomes clear as to which annotated portions of the script 150 are to be executed and which are not due to conditional logic disposed in the script 150, the expected duration of execution can be refined. Finally, as the duration values in the history table 130 become refined through the observation of historical duration values, the expected duration of execution for the entirety of the script 150 can become a more accurate representation of the actual duration of execution.

Figure 2:
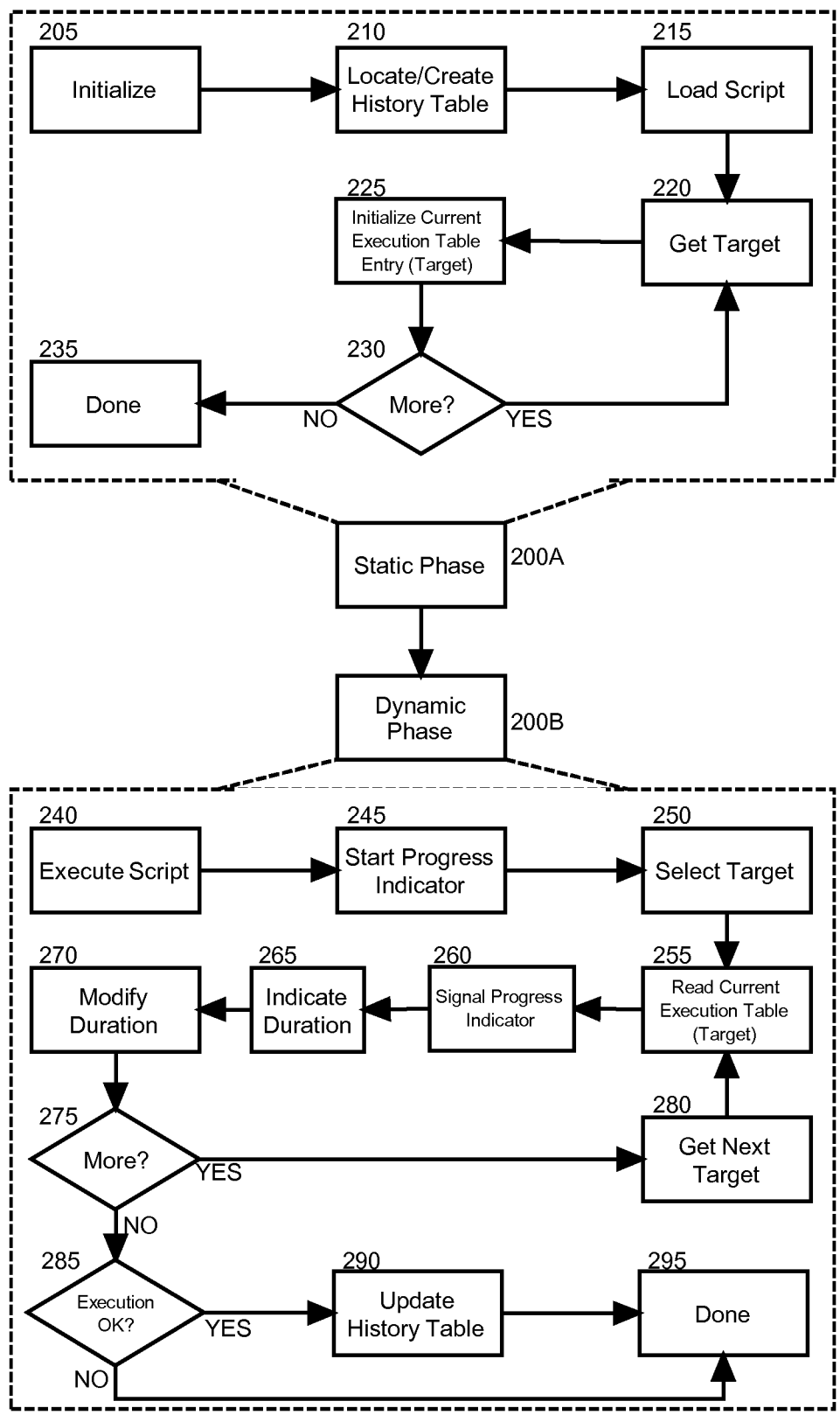

FIG. 2 is a flow chart illustrating a process for intelligent progress indication for script processing. The process can include a static phase 200A and a dynamic phase 200B. In the static phase 200A, the process can begin in block 205 in which the requisite variables can be initialized to a zero value, including a variable for the duration units completed and the duration units expected. In block 210, the history table for the script can be located, or in the alternative created. In block 215, the script itself can be loaded for processing and parsed to identify each target denoted as an annotated portion of the script. For each identified target, the expected duration can be summed into the variable for duration units expected. Additionally, for each identified target, the conditions of execution can be identified so as to facilitate the determination during the dynamic phase 200B of whether the logic of the identified target will be executed relative to the specified condition of execution. In this regard, in block 220, a first target can be obtained and in block 225, the relevant data can be written to a corresponding record in the current execution table for the target. Thereafter, in decision block 230 if additional targets remain to be processed, the process can repeat through block 220 until no further targets remain. Thereafter, in block 235 the static phase 200A can end.

In the dynamic phase 200B, in block 240 the script can be executed and in bock 245, the progress indicator can be started. In block 250, a target in the script can be selected for execution. In block 255, the expected duration of execution for the script can be determined from the current execution table for the target. In block 260, the progress indicator can be signaled to display the progress of script execution and the expected duration of execution for the script can be displayed in the progress indicator in block 265. In block 270, the expected duration of the script can be modified to account for the measured duration of execution for target. Optionally, the result of the execution of the target can considered to determine whether any other targets no longer can be executed due to an associated condition.

If so, the expected duration of execution of the script can be adjusted accordingly. In decision block 275, if additional targets remain to be encountered, in block 280 the next target encountered can be retrieved for processing and the process can repeat through block 255. When no further targets remain to be encountered in the script, in decision block 285, it can be determined whether the script execution completed successfully. If so, in block 290 the history table can be updated based upon the duration of targets executed by the script. In this regard, a mapping between script units and clock time can be preserved and refined through the updating of the history table such that the number of units executed and the time consumed for an execution can be accumulated for different executions in order to produce a refined mapping of execution unit execution duration. In any case, once the history table has updated, in block 295 the process can end.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A progress indication data processing system comprising:
a processor having a script execution engine;
a memory stored therein a history table; and,
a smart progress indicator coupled to the history table, the smart progress indicator comprising program code enabled during execution by the processor to compute an expected duration of execution of a script by the script execution engine based upon measured observed durations of execution for annotated portions of the script, to determine conditions precedent to executing the annotated portions of the script, to select individual ones of the annotated portions unable to be executed based upon the conditions precedent, and to modify the expected duration of execution of the script to account for the selected individual ones of the annotated portions unable to be executed.

2. The system of claim 1, wherein the script execution engine is an ANT configured script execution engine and wherein the script is an ANT script.

3. The system of claim 1, wherein the annotated portions of the script comprise script logic identified by a tag specifying a duration of execution for the script logic.

4. The system of claim 1, wherein the annotated portions of the script comprise script logic identified by a tag specifying a duration of execution for the script logic and conditions precedent for executing the script logic.

5. The system of claim 1, wherein the smart progress indicator further comprises program code enabled to establish an expected relative duration for each annotated portion of the script.

6. The system of claim 5, wherein the smart progress indicator further comprises program code enabled to update after a successful script execution the expected relative duration for each annotated portion of the script in the history table, with observed duration of execution values for each annotated portion of the script.

7. The system of claim 6, wherein the smart progress indicator further comprises program code enabled to update after the successful script execution the expected relative duration for each annotated portion of the script in the history table, with observed duration of execution values for each annotated portion of the script by averaging each observed duration into an existing value of the expected relative duration for each annotated portion of the script in the history table.

8. The system of claim 5, wherein the expected relative duration for each annotated portion of the script is an integer value.

9. The system of claim 8, wherein the integer value correlates to a subjective duration indicating one of a short duration, a medium duration, a long duration, and a very long duration.

10. A progress indication method for script processing, the method comprising:
computing an expected duration of execution of a script by a script execution engine based upon measured observed durations of execution for annotated portions of the script, each annotation indicating an expected duration of execution for a corresponding portion of the script;
determining conditions precedent to executing the annotated portions of the script;
selecting individual ones of the annotated portions unable to be executed based upon the conditions precedent;
modifying the expected duration of execution of the script to account for the selected individual ones of the annotated portions unable to be executed; and,
rendering a progress indication of the execution of the script according to the modified expected duration of execution of the script and an observed completion of execution of portions of the script.

11. The method of claim 10, wherein computing the expected duration of execution of the script by the script execution engine based upon measured observed durations of execution for annotated portions of the script each annotation indicating the expected duration of execution for the corresponding portion of the script, comprises:
identifying annotated portions of the script;

determining an expected duration of execution for each of the annotated portions;

computing the expected duration of execution of the script based upon the expected duration of execution determined for each of the annotated portions;

providing an indication of the computed expected duration;

executing at least one of the annotated portions;

measuring an actual duration of execution for the at least one annotated portion; and, modifying the expected duration of execution of the script to account for the actual duration of execution for the at least one annotated portion.

12. The method of claim 11, further comprising storing the expected duration of execution determined for each of the annotated portions in a history table.

13. The method of claim 12, further comprising factoring observed durations of execution for the annotated portions into stored duration values in the history table for corresponding ones of the annotated portions.

14. The method of claim 13, wherein factoring observed durations of execution for the annotated portions into stored duration values in the history table for corresponding ones of the annotated portions, comprises averaging each observed duration into an existing value of the stored duration values for the corresponding portion of the script in the history table.

15. The method of claim 10, further comprising:

establishing an expected relative duration of execution for each annotated portion of the script, the expected relative duration of execution being an integer value correlating to a subjective duration indicating one of a short duration, a medium duration, a long duration, and a very long duration.

16. A computer program product comprising a non-transitory computer usable medium embodying computer usable program code for progress indication in script processing, the computer program product including:

computer usable program code for computing an expected duration of execution of a script by a script execution engine based upon measured observed durations of execution for annotated portions of the script each annotation indicating an expected duration of execution for a corresponding portion of the script;

computer usable program code for determining conditions precedent to executing the annotated portions of the script;

computer usable program code for selecting individual ones of the annotated portions unable to be executed based upon the conditions precedent;

computer usable program code for modifying the expected duration of execution for the script to account for the selected individual ones of the annotated portions unable to be executed; and, computer usable program code for rendering a progress indication of the execution of the script according to the modified expected duration of execution of the script and an observed completion of execution of portions of the script.

17. The computer program product of claim 16, wherein the computer usable program code for computing the expected duration of execution of the script by the script execution engine based upon measured observed durations of execution for annotated portions of the script each annotation indicating the expected duration of execution for the corresponding portion of the script, comprises:

computer usable program code for identifying annotated portions of the script;

computer usable program code for determining an expected duration of execution for each of the annotated portions;

computer usable program code for computing the expected duration of execution of the script based upon the expected duration of execution determined for each of the annotated portions;

computer usable program code for providing an indication of the computed expected duration;

computer usable program code for executing at least one of the annotated portions;

computer usable program code for measuring an actual duration of execution for the at least one annotated portion; and, computer usable program code for modifying the expected duration of execution of the script to account for the actual duration of execution for the at least one annotated portion.

18. The computer program product of claim 17, further comprising computer usable program code for storing the expected duration of execution determined for each of the annotated portions in a history table.

19. The computer program product of claim 18, further comprising computer usable program code for factoring observed durations of execution for the annotated portions into stored duration values in the history table for corresponding ones of the annotated portions.

20. The computer program product of claim 16, further comprising:

computer usable program code for establishing an expected relative duration of execution for each annotated portion of the script, the expected relative duration of execution being an integer value correlating to a subjective duration indicating one of a short duration, a medium duration, a long duration, and a very long duration.

* * * * *